United States Patent [19]

Klein et al.

[11] 4,290,702
[45] Sep. 22, 1981

[54] PLASTICATING APPARATUS FOR MOLDING DEVICES

[75] Inventors: Reuben Klein, Edison; Imrich Klein, Highland Park, both of N.J.

[73] Assignee: Scientific Process & Research, Inc., Highland Park, N.J.

[21] Appl. No.: 104,094

[22] Filed: Dec. 17, 1979

[51] Int. Cl.³ .............................................. B29B 1/06
[52] U.S. Cl. ...................................... 366/77; 366/78; 366/293
[58] Field of Search .................... 366/78, 79, 87, 293, 366/294, 295, 296, 77, 76, 75, 332, 334, 320, 318; 425/207, 208

[56] References Cited

U.S. PATENT DOCUMENTS 3,797,808  3/1974  Peter ...................................... 366/78
3,924,842  12/1975  Klein ...................................... 366/79

Primary Examiner—Robert W. Jenkins
Attorney, Agent, or Firm—Samuelson & Jacob

[57] ABSTRACT

A plasticating apparatus operates continuously to plasticate material which is delivered intermittently to a molding device, the plasticating apparatus including a first screw conveyor which rotates in a barrel, a backfeed passage within the first screw conveyor and a second screw conveyor in the backfeed passage arranged to recirculate material in a circuit extending back through the backfeed passage. The first screw conveyor reciprocates axially so that during periods of non-delivery of plasticated material, the capacity of the circuit is increased to accommodate the accumulation of added plasticated material generated by the continuous rotation of the first screw conveyor.

9 Claims, 4 Drawing Figures

PLASTICATING APPARATUS FOR MOLDING DEVICES

The present invention relates generally to plasticating apparatus and pertains, more specifically, to plasticating apparatus used in connection with intermittently operated molding devices in molding machines, such as reciprocating-screw injection molding machines.

At present, injection molding machines include molding devices in the form of molds which are supplied with melted, or plasticated, material by plasticating apparatus which utilize reciprocating screw conveyors to plasticate and deliver melt to the molds. Because such an injection molding device requires only intermittent delivery of plasticated material thereto, melted material, generated by the rotation of the screw conveyor after the mold already is filled with plasticated material accumulates at the downstream end of the screw conveyor, either in the barrel of the plasticating apparatus or in an additional reservoir. When the available volume is filled with melted material, rotation of the screw conveyor is discontinued until the mold is ready to accept another charge of melted material. During the time that the screw conveyor remains stationary, no new melt is being generated and any residual melting which may continue within the plasticating apparatus takes place in a very inefficient manner.

It is an object of the present invention to provide plasticating apparatus which can operate continuously to plasticate material effectively even though the melted material is delivered only intermittently to the mold of a molding machine.

Another object of the invention is to provide plasticating apparatus for use in connection with an intermittently operated molding device and which operates continuously with high efficiency to plasticate material more uniformly and with better control over the melting process.

Yet another object of the invention is to provide plasticating apparatus in which portions of the material being processed therein are subjected to recirculation through a backfeed passage provided in the screw conveyor thereof for recirculation such that rotation of the screw conveyor is not interrupted despite intermittent delivery of plasticated material from the plasticating apparatus.

Still another object of the invention is to provide plasticating apparatus of the type having a screw conveyor for use in an injection molding machine, the plasticating apparatus being capable of continuous operation with uninterrupted constant speed rotation of the screw conveyor.

A further object of the invention is to provide plasticating apparatus of the type described and in which better mixing of the plasticated material is attained.

A still further object of the invention is to provide plasticating apparatus of the type described and in which there is a continuous generation of viscous heat due to the continuous rotation of the screw conveyor thereof.

Yet a further object of the invention is to provide plasticating apparatus for injection molding which attains consistent high quality in the production of melt, with greater efficiency.

The above objects, as well as still further objects and advantages, are attained by the present invention which may be described briefly as apparatus for plasticating material to be delivered intermittently to a molding device, the apparatus operating continuously during periods of delivery and non-delivery of plasticated material, the apparatus comprising: a barrel; a first screw conveyor in the barrel, the first screw conveyor including a flight defining a channel for continuously conveying the material in a downstream direction as the material is melted within the channel, the flight having a leading face facing downstream and a trailing face facing upstream, the channel extending between the leading face and the trailing face; a backfeed passage within the first screw conveyor, the backfeed passage communicating with the channel at a downstream location and at an upstream location to establish a circuit along which the material will move through the channel and the backfeed passage; a second screw conveyor located in the backfeed passage and arranged to convey material from the downstream location to the upstream location so as to enable recirculation of material along the circuit through the backfeed passage and the channel during continuous rotation of the first screw conveyor and intermittent delivery of plasticated material to the molding device; the first screw conveyor having a downstream terminal end and being mounted for axial movement relative to the barrel such that movement in the upstream direction will increase the capacity of the circuit to accommodate added plasticated material to be accumulated within the circuit as the first screw conveyor continues to rotate and generate the added plasticated material during periods of non-delivery of plasticated material to the molding device.

The invention will be understood more fully, while still further objects and advantages will become apparent, in the following detailed description of embodiments thereof illustrated in the accompanying drawing, in which.

Figure 1:
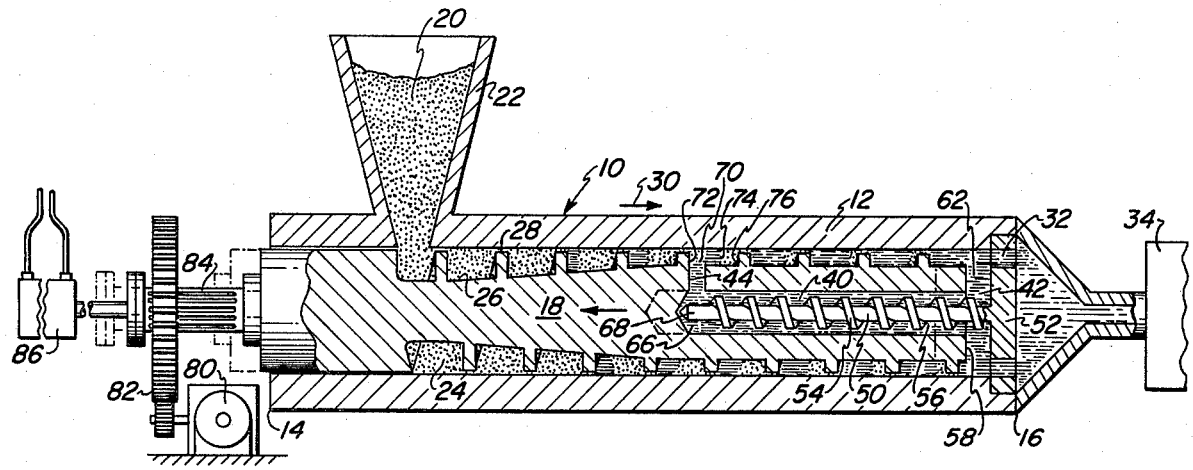
FIG. 1 is a largely schematic longitudinal cross-sectional view of an apparatus constructed in accordance with the invention.

Referring now to the drawing, and especially to FIG. 1 thereof, a plasticating apparatus constructed in accordance with the invention is shown at 10. Apparatus 10 is a screw-type plasticating apparatus and includes a longitudinally extending barrel 12, extending axially between an upstream end 14 and a downstream end 16, and a screw conveyor 18 in the barrel. A reservoir of solid material 20 is held in a hopper 22 which communicates with an inner chamber 24 of the barrel 12 adjacent the upstream end 14 and feeds the solid material 20 into a channel 26 defined by a helical flight 28 on screw conveyor 18. Rotation of the screw conveyor 18 within the barrel 12 will advance the material 20 along the channel 26 in a downstream direction 30 until the material is delivered, in plasticated (melted) form, to a discharge point 32 at the downstream end 16 of the barrel.

Discharge point 32 communicates with an injection molding device, shown schematically in the form of a mold at 34, so that the plasticating apparatus 10 and the mold 34 together comprise an injection molding machine in which the mold 34 is filled with melt intermittently. Although mold 34 requires the delivery of the plasticated material, or melt, only intermittently, screw conveyor 18 is rotated continuously during periods of delivery and non-delivery and generates plasticated material continuously. In order to accommodate continuous rotation of the screw conveyor 18, an inner passage 40 is provided within screw conveyor 18, the inner passage 40 communicating with channel 26 of the screw conveyor 18 at a downstream location 42 and at an upstream location 44 so that passage 40 provides a backfeed passage between the downstream location 42 and the upstream location 44. Thus, during periods of non-delivery of plasticated material, at least a portion of the plasticated material will be recirculated continuously along a circuit including channel 26 and backfeed passage 40 between the downstream location 42 and the upstream location 44, enabling continuous rotation of screw conveyor 18.

Recirculation of plasticated material through the backfeed passage 40 is facilitated by a second screw conveyor 50 which is affixed to the barrel 12 by means of a perforated mounting plate 52 and extends axially into passage 40 parallel with the first screw conveyor 18 and coaxial therewith. Second screw conveyor 50 is stationary and includes a flight 54 pitched in the appropriate direction to move material in an upstream direction in response to rotation of the first screw conveyor 18. As seen in FIG. 1, flight 54 of second screw conveyor 50 provides a backfeed channel 56 which preferably begins downstream beyond the terminal end 58 of first screw conveyor 18 so as to facilitate the feed of material into the backfeed passage 40.

In order to accommodate added plasticated material generated during periods of non-delivery of plasticated material to the mold 34, the first screw conveyor 18 is mounted for axial movement relative to the barrel 12. Thus, as added plasticated material is generated, first screw conveyor 18 is moved in an upstream direction in response to the build-up of added plasticated material, thereby increasing the volumetric capacity of the recirculation circuit which includes channel 26, and passage 40. The increased capacity is obtained by the increase in volume at 62, adjacent the downstream terminal end 58 of screw conveyor 18, and the increase in volume at 66, adjacent the upstream terminal end 68 of screw conveyor 50, as depicted in phantom. Since the downstream location 42 is at the downstream terminal end 58 of screw conveyor 18, much of the recirculated material received within the passage 40 adjacent the downstream terminal end 58 is plasticated material. Whatever solids remain in the material which enters passage 40 at the downstream location 42 will become melt during recirculation.

It is noted that the melting process which takes place within a screw-type plasticating apparatus is explained in detail in U.S. Pat. No. 3,924,842 wherein it is pointed out that a melt pool begins to form at the leading face of the flight of the screw conveyor while a solid bed lies contiguous with the opposed trailing face of the flight. In the present illustration of FIG. 1, the melt pool is shown at 70, adjacent the leading face 72 of flight 28 of screw conveyor 18, and the solid bed is shown at 74, adjacent the trailing face 76 of flight 28. Preferably, the upstream location 44 is placed adjacent the leading face 72 of flight 28 so that the recirculated plasticated material returns to the portion of channel 26 containing melted material. Rotation of screw conveyor 18 is continued by a drive motor 80 and drive train 82 which is coupled to the screw conveyor 18 through a splined shaft 84 integral with the screw conveyor 18 and slidable axially relative to the axially stationary drive train 82 in response to axial movement of the screw conveyor 18. When the injection molding machine 34 is ready for another charge of plasticated material, screw conveyor 18 is moved by an actuator, shown in the form of a hydraulic cylinder 86, in a downstream direction without disruption of the rotation of the screw conveyor 18.

Thus, screw conveyor 18 is able to rotate continuously, and preferably at a constant speed, for maximum melting efficiency and effective steady-state operation. Melting is facilitated by the constant generation of viscous heat without reliance upon increased amounts of heat conducted through barrel 12 to the material. Better mixing of the plasticated material is obtained by virtue of the uninterrupted rotation of the screw conveyor 18 and recirculation through the backfeed passage 40, thereby increasing the quality of the melt.

Figure 2:
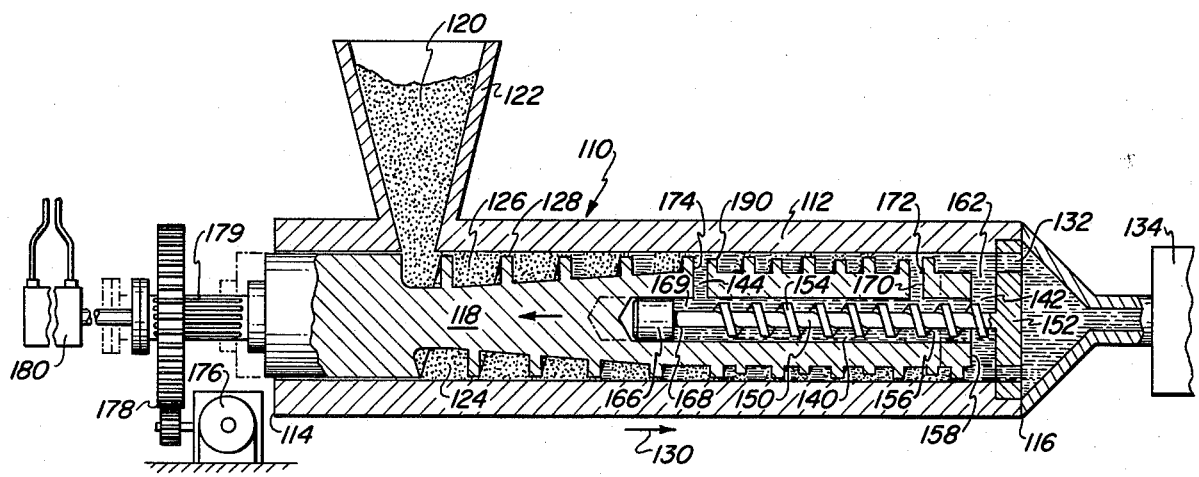
FIG. 2 is a largely schematic longitudinal cross-sectional view of another apparatus constructed in accordance with the invention.

Turning now to FIG. 2, another plasticating apparatus constructed in accordance with the invention is shown in the form of screw-type plasticating apparatus 110. Apparatus 110 includes a longitudinally extending barrel 112, extending axially between an upstream end 114 and a downstream end 116, and a screw conveyor 118 in the barrel. A reservoir of solid material 120 is held in a hopper 122 which communicates with an inner chamber 124 of the barrel 112 adjacent the upstream end 114 and feeds the solid material 120 into a channel 126 defined by a helical flight 128 on screw conveyor 118. Rotation of the screw conveyor 118 within the barrel 112 will advance the material 120 along the channel 126 in a downstream direction 130 until the material is delivered, in plasticated, or melted, form, to a discharge point 132 at the downstream end 116 of the barrel.

Discharge point 132 communicates with an injection molding device, shown schematically in the form of a mold at 134, so that the plasticating apparatus 110 and the mold 134 together comprise an injection molding machine in which the mold 134 is filled with melt intermittently. Although mold 134 requires the delivery of the plasticated material, or melt, only intermittently, screw conveyor 118 is rotated continuously during periods of delivery and non-delivery and generates plasticated material continuously. In order to accommodate continuous rotation of the screw conveyor 118, an inner passage 140 is provided within screw conveyor 118, the inner passage 140 communicating with channel 126 of the screw conveyor 118 at a downstream location 142 and at an upstream location 144 so that passage 140 provides a backfeed passage between the downstream location 142 and the upstream location 144. Thus, during periods of non-delivery of plasticated material to mold 134, at least a portion of the plasticated material will be continuously recirculated along a circuit including channel 126 and backfeed passage 140 between the downstream location 142 and the upstream location 144, enabling continuous rotation of screw conveyor 118.

Recirculation of plasticated material through the backfeed passage 140 is facilitated by a second screw conveyor 150 which is affixed to the barrel 112 by means of a perforated mounting plate 152 and extends axially into passage 140 parallel with the first screw conveyor 118 and coaxial therewith. Second screw conveyor 150 is stationary and includes a flight 154 pitched in the appropriate direction to move material in an upstream direction in response to rotation of the first screw conveyor 118. Flight 154 of second screw conveyor 150 provides a backfeed channel 156 which preferably begins downstream beyond the terminal end 158 of first screw conveyor 118 so as to facilitate the feed of material into the backfeed passage 140.

As in the earlier-described plasticating apparatus 10, added plasticated material generated during periods of non-delivery of plasticated material is accommodated by mounting the first screw conveyor 118 for axial movement relative to barrel 112. Thus, as added plasticated material is generated, first screw conveyor 118 is moved in an upstream direction in response to the build-up of added plasticated material and the volumetric capacity of the recirculation circuit is increased at 162, adjacent the downstream terminal end 158 of the screw conveyor 118. In this instance, however, an axially stationary core rod 166 is placed within the screw conveyor 118 to assure that the upstream terminal end 168 of the second screw conveyor 150 remains in close proximity with the end 169 of the passage 140 so that plasticated material is not accumulated in any enlarged pocket formed between the end 169 of passage 140 and the upstream terminal end 168 of the second screw conveyor 150. Core rod 166 is integral with second screw conveyor 150 and thus remains stationary.

In addition, a further inlet 170 communicates with channel 126 and passage 140 at a downstream location spaced upstream of the downstream terminal end 158 of screw conveyor 118. Inlet 170 is located adjacent the trailing face 172 of flight 128 so that, as explained in the aforesaid patent no. 3,924,842, solid material will be introduced into passage 140 to enhance the plasticating operation of extruder 110. Recirculated material is returned to the channel 126 adjacent a leading face 174 of flight 128. Rotation of screw conveyor 118 is continued by a drive motor 176 coupled to the screw conveyor by a drive train 178 and splined shaft 179. Screw conveyor 118 is moved axially in a downstream direction by an actuator 180 without disruption of the rotation of screw conveyor 118.

Figure 3:
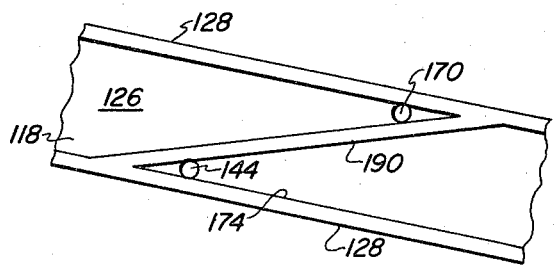
FIG. 3 is a diagram depicting the arrangement of flights on the screw conveyor of the apparatus of FIG. 2.

In order to increase the effectiveness of the recirculation which takes place through inlet 170, and auxiliary barrier flight 190 is placed on screw conveyor 118. As best seen in FIG. 3, as well as in FIG. 2, barrier flight 190 isolates the already plasticated material from the still unmelted material lying adjacent the trailing face 172 of flight 128 and aids in assuring that mostly solid material will be drained into passage 140 through inlet 170. Further, barrier flight 190 directs unplasticated material to the inlet 170 for recirculation through backfeed passage 140.

Figure 4:
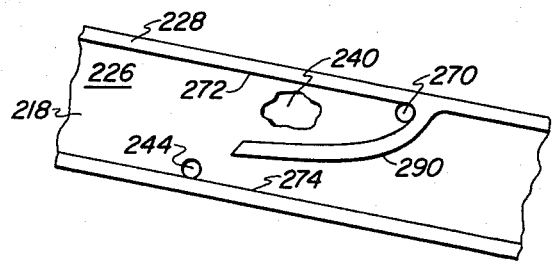
FIG. 4 is a diagram depicting an alternate arrangement of flights on a screw conveyor similar to that of the apparatus of FIG. 2.

As illustrated in FIG. 4, an alternate screw conveyor 218, which has a channel 226 defined by a helical flight 228, includes an inner backfeed passage 240 communicating with channel 226 at a downstream location and at an upstream location 244. A further inlet 270 communicates with channel 226 and backfeed passage 240 adjacent the downstream terminal end of screw conveyor 218. Inlet 270 is located adjacent the trailing face 272 of flight 228 so that solid material will be introduced into backfeed passage 240. Recirculated material is returned to channel 226 adjacent leading face 274 of flight 228. An alternate partial barrier flight 290 isolates the already plasticated material from the still unmelted material lying adjacent the trailing face 272 of flight 228 and aids in assuring that mostly solid material will be drained into passage 240 through inlet 270.

It is to be understood that the above detailed description of preferred embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for plasticating material to be delivered intermittently to a molding device, said apparatus operating continuously during periods of delivery and non-delivery of plasticated material, said apparatus comprising:

a barrel;

a first screw conveyor in the barrel, said first screw conveyor including a flight defining a channel for continuously conveying the material in a downstream direction as the material is melted within the channel, said flight having a leading face facing downstream and a trailing face facing upstream, said channel extending between the leading face and the trailing face;

a backfeed passage within the first screw conveyor, said backfeed passage communicating with the channel at a downstream location and at an upstream location to establish a circuit along which the material will move through the channel and the backfeed passage;

a second screw conveyor located in said backfeed passage and arranged to convey material from the downstream location to the upstream location so as to enable recirculation of material along the circuit through the backfeed passage and the channel during continuous rotation of the first screw conveyor and intermittent delivery of plasticated material to the molding device;

the first screw conveyor having a downstream terminal end and being mounted for axial movement relative to the barrel such that movement in the upstream direction will increase the capacity of the circuit to accommodate added plasticated material to be accumulated within the circuit as the first screw conveyor continues to rotate and generate the added plasticated material during periods of non-delivery of plasticated material to the molding device.

2. The invention of claim 1 wherein the downstream location is in position to receive plasticated material from the channel and the upstream location is positioned upstream of the downstream location.

3. The invention of claim 2 wherein the downstream location is positioned adjacent the downstream terminal end of the first screw conveyor.

4. The invention of claim 1 wherein the downstream location is in position to receive at least some unplasticated material from the channel and the upstream location is spaced axially upstream of the downstream location a distance sufficient to enable plastication within the backfeed passage of at least some of the unplasticated material admitted to the backfeed passage.

5. The invention of claim 4 including a barrier flight on the first screw conveyor for directing unplasticated material into the backfeed passage and isolating from the unplasticated material in the channel the already plasticated material.

6. The invention of claim 1, 2, 3, 4 or 5 wherein the backfeed passage extends generally parallel to the axis of rotation of the first screw conveyor, and the second screw conveyor extends axially into the backfeed passage.

7. The invention of claim 6 wherein the second screw conveyor includes a backfeed channel which begins downstream of the terminal end of the first screw conveyor.

8. The invention of claim 6 wherein the second screw conveyor is maintained stationary relative to the barrel.

9. The invention of claim 8 wherein the second screw conveyor includes a backfeed channel which begins downstream of the terminal end of the first screw conveyor.

* * * * *